US009977777B2

(12) United States Patent
Boss et al.

(10) Patent No.: US 9,977,777 B2
(45) Date of Patent: May 22, 2018

(54) SYSTEM AND METHOD FOR READ-AHEAD ENHANCEMENTS

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Kevin C. McConnell, Austin, TX (US); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 15/050,591

(22) Filed: Feb. 23, 2016

(65) Prior Publication Data

US 2016/0179781 A1 Jun. 23, 2016

Related U.S. Application Data

(63) Continuation of application No. 13/594,159, filed on Aug. 24, 2012, now Pat. No. 9,323,734, which is a (Continued)

(51) Int. Cl.
*G06F 3/00* (2006.01)
*G06F 17/27* (2006.01)
(Continued)

(52) U.S. Cl.
CPC .......... *G06F 17/276* (2013.01); *G06F 17/243* (2013.01); *G06F 17/30616* (2013.01);
(Continued)

(58) Field of Classification Search
CPC ................ G06F 17/276; G06F 17/243; G06F 17/30616; G06F 17/30631; G06F 17/30702; H04L 51/00
See application file for complete search history.

(56) References Cited

U.S. PATENT DOCUMENTS 5,857,179 A 1/1999 Vaithyanathan et al.
5,969,326 A 10/1999 Ogami
(Continued)

FOREIGN PATENT DOCUMENTS

GB 2365150 A 2/2002

*Primary Examiner* — Sara England

(74) *Attorney, Agent, or Firm* — Christopher K. McLane; Andrew M. Calderon; Roberts Mlotkowski Safran Cole & Calderon, P.C.

(57) ABSTRACT

A method and system are provided for identifying type-ahead candidates. A method includes determining a context of past non-threaded emails of a user. The method further includes generating a context index associating the past non-threaded emails of the determined context with repeatable values within the past non-threaded emails. The method further includes receiving characters in a current email and determining a context of the current email. The method further includes determining matches between the current email and the past non-threaded in the context index. The method further includes identifying the corresponding repeatable values and matching the identified corresponding repeatable values with the received characters. The method further includes presenting the candidate words to the user for inclusion in the current email.

17 Claims, 4 Drawing Sheets

START 400
USER INPUTS CHARACTERS IN DATA FIELD 405
COMPARE POTENTIAL MATCHES 410
ADDITIONAL CHARACTER INPUTS? 415
Yes
No
ANALYZE CURRENT DOCUMENT FOR CONTEXT (KEYWORDS AND PHRASES) 420
PRIORITIZE MATCHES 460
DISPLAY RESULT IN FIELD 465
EXIT 470
START 428
GO TO FIRST/NEXT DOCUMENT 430
ANALYZE STORED DOCUMENT FOR CONTEXT (KEYWORDS AND PHRASES) 435
ASSOCIATE ADDRESSABLE NAMES 440
INDEX RESULTS 445
CONTACT INDEX 455
DOCUMENTS REMAINING? 450
Yes
EXIT 475

Related U.S. Application Data continuation of application No. 11/029,756, filed on Jan. 4, 2005, now Pat. No. 8,296,678.

(51) Int. Cl.
*G06F 17/24* (2006.01)
*G06F 17/30* (2006.01)
*H04L 12/58* (2006.01)

(52) U.S. Cl.
CPC .. *G06F 17/30631* (2013.01); *G06F 17/30702* (2013.01); *H04L 51/00* (2013.01)

(56) References Cited

U.S. PATENT DOCUMENTS

| | | | |
|---|---|---|---|
| 5,973,665 | A | 10/1999 | Davie et al. |
| 6,005,928 | A | 12/1999 | Johnson |
| 6,011,554 | A | 1/2000 | King et al. |
| 6,341,280 | B1 | 1/2002 | Glass et al. |
| 6,377,965 | B1 | 4/2002 | Hachamovitch et al. |
| 6,438,543 | B1 | 8/2002 | Kazi et al. |
| 6,460,074 | B1 | 10/2002 | Fishkin |
| 6,507,866 | B1 | 1/2003 | Barchi |
| 6,539,421 | B1 | 3/2003 | Appelman et al. |
| 6,684,238 | B1 | 1/2004 | Dutta |
| 6,725,228 | B1 | 4/2004 | Clark et al. |
| 6,781,575 | B1 | 8/2004 | Hawkins et al. |
| 6,859,213 | B1 | 2/2005 | Carter |
| 6,950,988 | B1 | 9/2005 | Hawkins et al. |
| 7,027,463 | B2 | 4/2006 | Mathew et al. |
| 7,043,700 | B1 | 5/2006 | Bertram et al. |
| 7,111,248 | B2 | 9/2006 | Mulvey et al. |
| 2002/0165932 | A1 | 11/2002 | Rensin et al. |
| 2002/0169839 | A1 | 11/2002 | Goldberg |
| 2002/0178229 | A1 | 11/2002 | Sinha et al. |
| 2003/0115279 | A1 | 6/2003 | Quine et al. |
| 2003/0233408 | A1 | 12/2003 | Goodman |
| 2003/0234821 | A1 | 12/2003 | Pugliese |
| 2004/0203949 | A1 | 10/2004 | Nielsen et al. |
| 2004/0215726 | A1 | 10/2004 | Arning et al. |
| 2004/0221016 | A1 | 11/2004 | Hatch et al. |
| 2006/0127871 | A1 | 6/2006 | Grayson |

SYSTEM AND METHOD FOR READ-AHEAD ENHANCEMENTS

FIELD OF THE INVENTION

The invention generally relates to a system and method for analyzing possible repeatable values for placement into a data field and, more particularly, to a system and method for analyzing possible repeatable values based on user-defined criteria.

There are many applications today which have the ability to assist an end user with data entry. Applications such as Lotus Notes®, Outlook Express®, That's Word®, and a host of others typically have some form of type-ahead features which are intended to make the end user more productive or accomplish the related task more efficiency. A significant problem with most existing solutions is that the repeatable data that is presented to the user is not contextual. For example, some popular email program assists a user with data entry in the "To" field by conveniently pre-filling the names of potential recipients by matching the characters the user has typed against the user's address book. In every case, the name that may be presented to the end user is the first match found alphabetically. So, to expand on the previous example, if the user is attempting to type the name "Dave Johnson" and the user has four names in the address book (namely Adams, Krantz, Jackson, and Johnson, for example) than as the user types the characters "Day" the system suggests via type-ahead functionality "e Adams" as a most likely match. Thus, it becomes obvious in this example that the last option presented to the user is the one that the user wanted and would have been most helpful had it been the first option presented.

Some type-ahead systems improve type-ahead functionality by analyzing the frequency of emails sent to and received by others and the history of emails in the same thread. In these types of type-ahead systems the method is limited to a correlation of threaded messages and the senders and receivers of those messages, and does not attempt to make a correlation between non-threaded messages. Threaded messages typically include those messages that are responses to responses or responses to an original message and are usually denoted by terms such as, for example, "forwarded" or "reply to" and where the history of the previous related message is included in the most recent message. In other words, it may be characterized that the messages are directly "linked." These systems typically determine relationships between senders and receivers purely on the threaded aspect and to no logical extension.

SUMMARY OF THE INVENTION

In an aspect of the invention, a method is provided for identifying type-ahead candidates. The method comprises the steps of matching one or more characters in a non-threaded document with one or more received characters to identify one or more candidate words, selecting the one or more candidate words based on the results of the matching step and presenting and including the selected one or more candidate words into a current document.

In another aspect of the invention, a system for identifying type-ahead candidates is provided. The system comprises at least one component to receive one or more characters to provide a basis to determine a match, match one or more characters in a non-threaded document with the received one or more characters to identify one or more candidate words and select the one or more candidate words based on the results of the match for presentation and inclusion into a current document.

In another aspect of the invention, a computer program product is provided comprising a computer usable medium having readable program code embodied in the medium. The computer program product includes at least one component to receive one or more characters to provide a basis to determine a match, analyze at least one non-threaded document to match one or more characters in the non-threaded document with the received one or more characters to identify one or more candidate words and select the one or more candidate words based on the results of the analyzing for presentation and inclusion into a current document.

DETAILED DESCRIPTION OF EMBODIMENTS OF THE INVENTION

This invention is directed, generally, to a system and method for analyzing potential repeatable values for placement into a data field based on user-defined criteria and/or contextual information from current or historical documents. The system and method includes analyzing relationships between documents for the purpose of correlating sender and receiver information into a context to more accurately populate type-ahead functions in repeatable data fields. Threaded messages are typically limited to those messages that are responses to responses or responses to an original message and are usually denoted by terms such as, for example, "forwarded" or "reply to" and where the history of the previous related message is included in the most recent message.

The invention expands correlation into non-thread related documents to achieve a higher correlation rate. The expanded documents may be any previous email or associated documents of a sender or receiver, including any documents defined by user criteria. In the case of standalone applications, such as word processors or spreadsheets, any user associated document, as defined by user criteria may be included in a contextual association for purposes of type-ahead analysis.

Careful application of logic and contextual information determines which repeatable data may be most meaningful to the end user. This data may come from an analysis of the current document, stored data related to the current document and a correlation between this and historical data available on previous documents. The system and method of the invention, in embodiments, may also be used in conjunction with applications such as web page fields (e.g., browsers), directory look-ups, instant messaging (IM) clients and email clients to increase accuracy and type-ahead hit rates. Documents that may be germane to a user context may be consulted for analysis. A context is typically arranged by function such as email related files (e.g., sent or received folders) and associated documents (e.g., attachments and linked documents), or arranged by folder structures on an application basis, such as word processing files which may constitute a context for a word processing application.

A context may be formed as appropriate by essentially any type of application employing type-ahead functionality by referencing files or documents as appropriate to the application. There may be common sharing of files and folders among differing applications such as, for example, address books, contact lists, or similar composite data.

Figure 1:
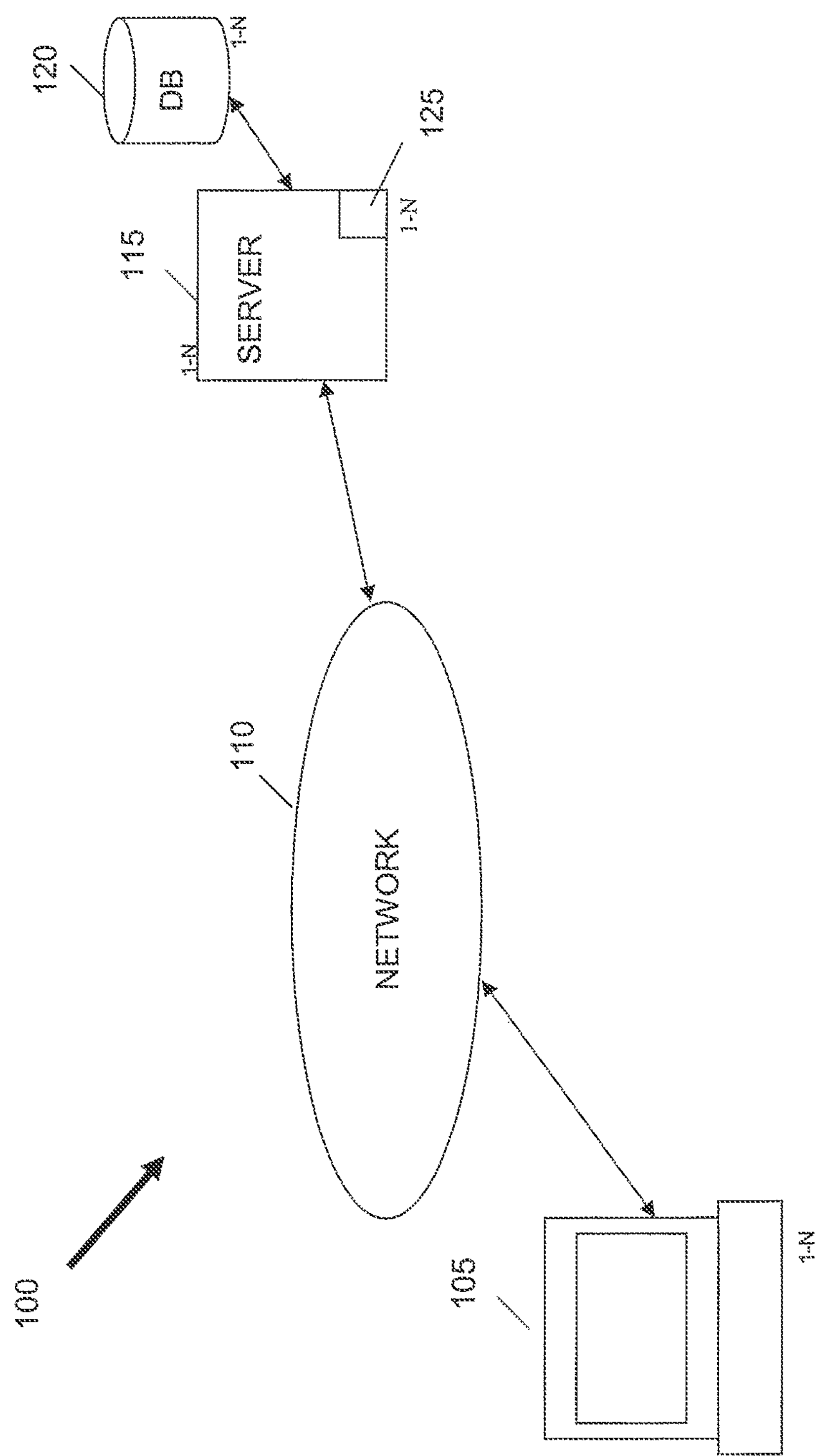
FIG. 1 is a block diagram showing an illustrative environment of the invention.

FIG. 1 is a block diagram showing an illustrative environment of the invention, generally denoted by reference numeral 100. The illustrative environment includes one or more computers 105 (e.g., a personal computer) interconnected to a network 110 (e.g., the Internet, or local area network (LAN)). Also included are one or more servers 115 that may provide one or more applications 125 such as email applications, word processors, financial packages, or any other application utilizing type-ahead functionality. The applications 125 may consult file storage such as database(s) 120 that may store current and/or historical documents such as emails, IM messages, word processing documents, or other application data for analyzing context of a user's input, which may include a context index 455 (FIG. 4), as described below. The illustrative environment 100 is but one example and one of ordinary skill in the art would recognize that many other variations may exist including non-server arrangements, all of which are contemplated by the invention.

By way of example, an email system is used to illustrate the system and method of the invention, but may be applied to other applications employing some type of correspondence and/or associated documents that may comprise a context. For example, a program agent, which may be an application 125, may analyze past emails, if available, or keep a running log/data base of messages sent, a record to whom, and messages received and from whom. A table may be created of corresponding values for emails that are considered similar in subject matter. This table may consist of uncommon words that show up in multiple emails and also common subject matter that may not necessarily have the same uncommon words. This correlation table may be derived by a combination of (i) pre-set lists of known uncommonly used words and/or (ii) a real-time analysis of the collection of emails and the related frequency of words whereby the least used, 10%, for example, of the words become the targets for comparison.

The program agent 125 may then correlate words and phrases within a current email or associated documents (such as attachments or linked documents) to similar words and phrases in past emails (and attachments or linked documents), which may not be in the same current thread, to give people or entities who were part of those previous correspondences (i.e., those who where senders or recipients) a heavier weight as choices for the type-ahead function in the current email. For example, the words "Disney," "Daffy," and "Mickey" may be in the main body of the current email and the program agent 125 may find a past email, e.g., not in the same thread, sent several months ago with the same three words in which the user sent an email to Eric Smith. The program agent 125 may determine that these words constitute a unique variation and high correlation, and then as the user types the letters "Eric" in the "Send To" field, the program agent then prefills "Eric Smith" instead of any other Eric that may be in the address book.

Figure 2:
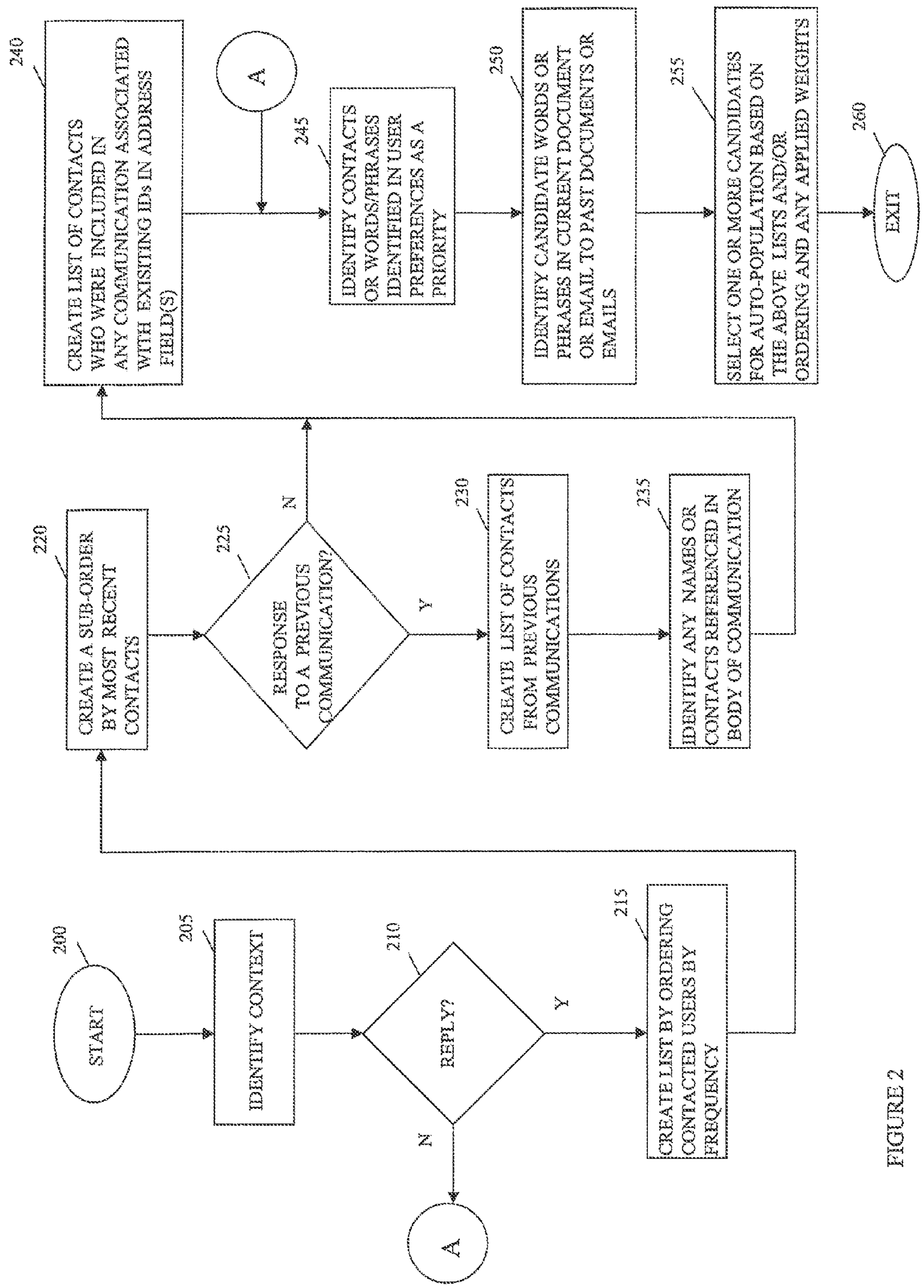
FIG. 2 is a flow diagram of an embodiment showing steps of using the invention.
Figure 3:
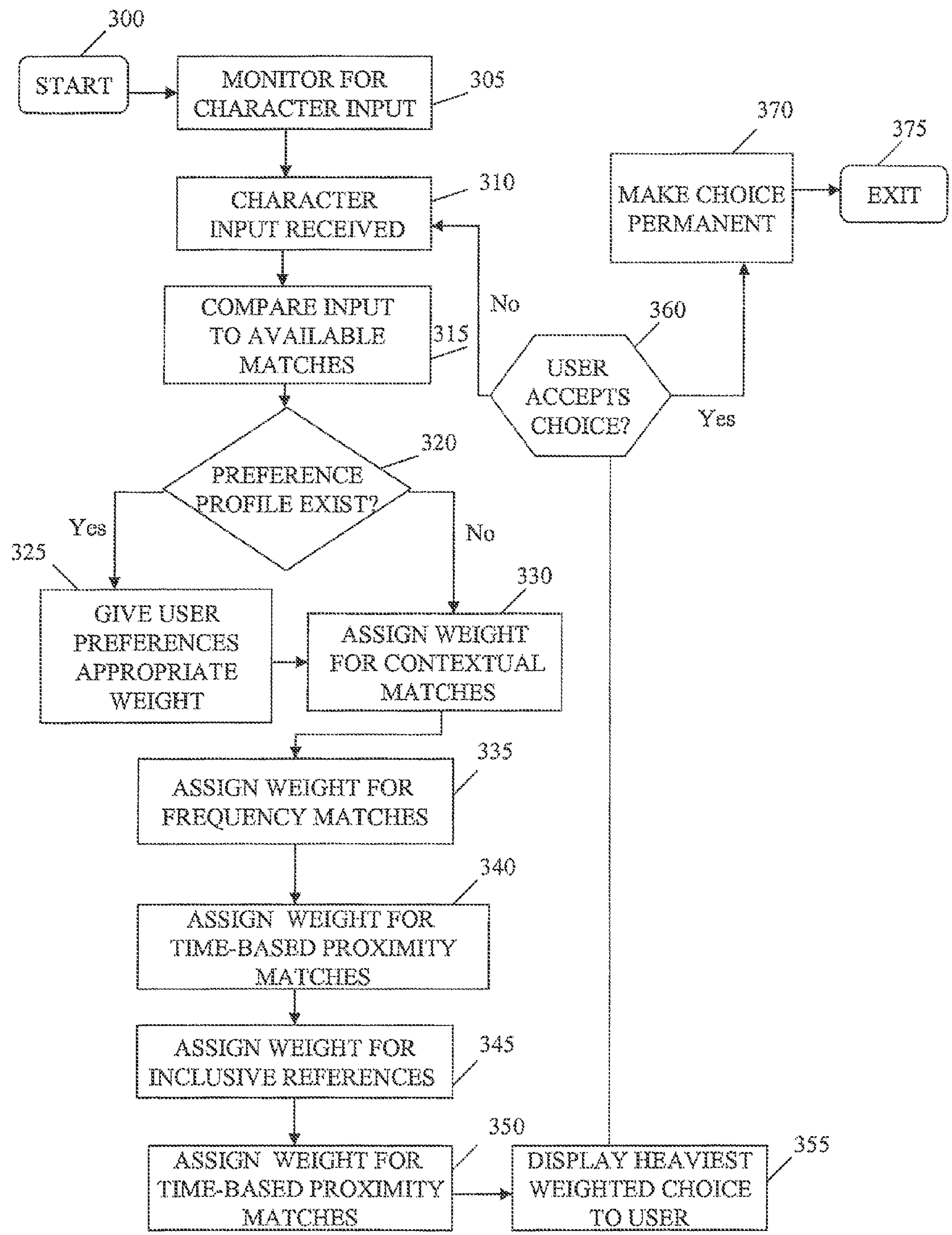
FIG. 3 is a flow diagram of an embodiment showing steps of using the invention.
Figure 4:
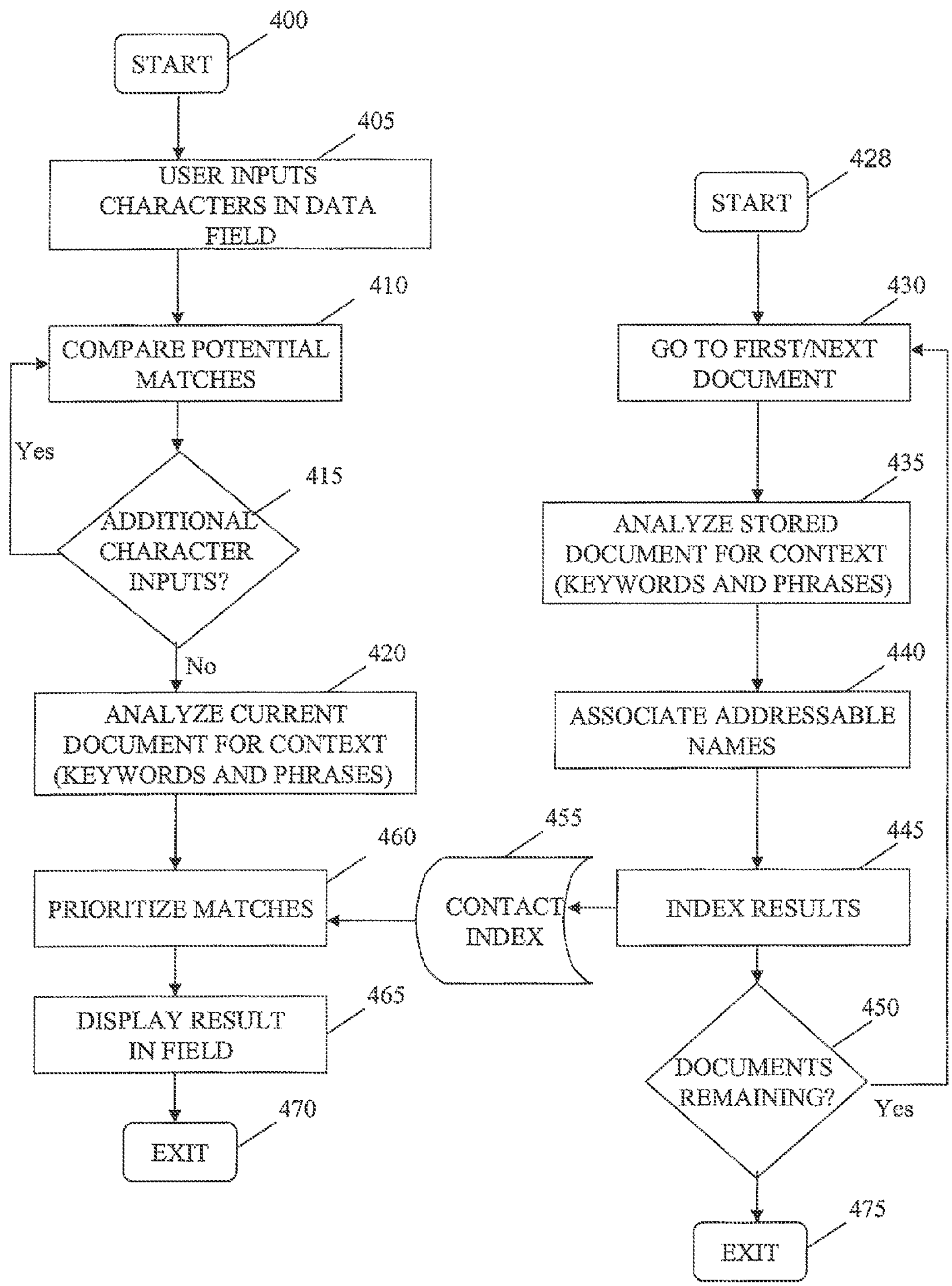
FIG. 4 is a flow diagram of an embodiment of using the invention.

FIG. 2 is a flow diagram of an embodiment showing steps of the invention, starting at step 200. FIGS. 2-4 may equally represent a high-level block diagram of components of the invention implementing the steps thereof. The steps of FIGS. 2-4 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

At step 205, documents and/or files that may be deemed germane to the user's context are identified for inclusion for analysis and cross-checking with user input to determine any type-ahead candidates. At step 210, a check may be made to determine if the user is replying to a communication such as an email, an IM, or the like. If not, the processing continues with step 245. However, if the user is replying to a communication, then at step 215, a list may be created from available context information (e.g., past emails or IMs) that reflects any users that have been contacted in the past. The list may be ordered based on frequency (e.g. descending order based on frequency). At step 220, a sub-ordering may be applied to reflect those contacts that have been most recently contacted (e.g., in descending order), which may be another list.

At step 225, a check may be made to determine if the user is responding to a previous communication. If not, the processing continues at step 240. Otherwise, at step 230, a list may be created that reflects known contacts that were included in previous communications with the user. The contacts may have been included in any one of the "To", "cc:", "bcc:" fields, for example. At step 235, any name or contact identified in the body of the previous or current correspondence and/or attachments may be compiled to generate candidates for type-ahead selection.

At step 240, a list may be created based on the existing names in the "To:" field reflecting the most often addressed (e.g., emailed) contacts that were also a part of other emails associated with the names in the "To:" field. That is, any contacts that were included in past emails of any of the current "To:" addresses may become candidates for a type-ahead auto-populate action. At step 245, any contacts or words/phrases identified by a user preference as a priority may be included as candidates or given higher preference, particularly if already a candidate on a previously compiled list.

At step 250, candidate words and/or phrase may be identified based on the current document or message body to past documents or message bodies having the same words and/or phrases. At step 255, based on the candidates created, one or more candidate type-ahead proposals may be selected for auto-populating. The selection process may give precedence to any list that the user may have given a higher weight. A user may establish a preference profile and, if applied, will allow a user to assign more weight to the available data being evaluated. In embodiments, the system and method of the invention may promote candidate choices to higher levels, in accordance with user preferences. The process ends at step 260.

FIG. 3 is a flow diagram of an embodiment showing steps of using the invention, starting at step 300. At step 305, input may be monitored for character input. At step 310, character input may be recognized as received. At step 315, the character input may be compared to available matches from a user's context (e.g., files, folders and/or messages, both current and historical/stored) associated with the application (e.g., email, IM, word processing, or the like) This may be partial or full matches on words, phrases, contacts or names, for example, as character input permits.

At step 320, a check is made whether a preference profile exists for the user. If so, at step 325, user preferences are applied with an appropriate specified weight. These preferences may include preferred contacts or names, words and/or phrases. If, however, a preference profile does not exist, then processing continues with step 330. At step 330, any predefined weights for contextual matches are assigned to candidate words, phrases or contacts. At step 335, weights for frequency of occurrence matches may be assigned to candidate words, phrases or contacts. That is, a weight may be assigned based on the frequency of occurrence of a word, phrase or contact found within context sources.

At step 340, weights may be assigned to candidate words, phrases or contacts for time-based proximity matches. That is, for example, matches that occur using more recent sources (i.e., documents or communications) within a predetermined number of days defined as "recent," may have higher weighting. Likewise, matches using older sources may have lower weighting assigned. At step 345, weights may be assigned for inclusive references as derived from data within the current message or entity (e.g., current email, IM, short message service (SMS) message, address book entry, or the like). Inclusive references include these textual matches found within a current message.

At step 350, weights may be assigned based on matches in associative references. Associative references are typically derived from data outside the current message or entity, and may be indirectly located through entities referencing other entities which have matching topics (e.g., subject line), words or phrases, contacts, or the like. At step 355, one or more choices with "heaviest" weights may be presented to the user for type-ahead choices. The presentation may include the top "N" heaviest weighted choices, or simply the heaviest weighted choice. At step 360, a check is made whether the user has accepted a proffered type-ahead choice. If not accepted, then processing continues with step 310 to receive more character input. If, however, the user accepts a proffered type-ahead choice, then at step 370, the accepted choice may be made permanent. At step 375, the process ends.

In this manner, a user may be offered one or more type-ahead choices that have been analyzed in view of a user's context which may include, for example, email history, document association, user preferences, document(s) word occurrences, time-based association, or the like. This typically provides a user with better probabilities that the proffered type-ahead offerings may be more accurate, thus enhancing productivity, user satisfaction and accuracy.

FIG. 4 is a flow diagram of an embodiment of using the invention, starting at step 400, and another flow may start at step 428, as explained below. At step 405, a user may input characters into a data field (e.g., an email, IM, or document). At step 410, the character input is compared to potential matches with type-ahead candidate words, phrases or contacts. At step 415, a check is made whether additional character input is required to complete a potential match (which may be a partial match of a word). If additional characters are required, then processing continues at step 410 to await more character input. If, however, additional character input is not necessary, then at step 420, the current document may be analyzed for context such as keywords and phrases. Processing continues with step 460, however, a second flow which may provide input to step 460 is now described.

A second parallel flow may start at step 428 and this flow may precede, be concurrent, or asynchronous with the flow entered at step 400. Typically, the flow entered at step 428 may be executed by one or more separate agents that scans for changes or new documents entering the system for updating a context index (e.g., a database) for use by the flow entered at step 400. Steps 428 through 450, in embodiments, may occur in parallel or asynchronous with steps 400 through 470. At step 430, a next (or first, as appropriate) stored document associated with the user's context may be identified. This may include historical emails and/or attachments, messages, or documents associated with the user and appropriate for the user's application (e.g., word processing or the like). At step 435, the next stored document may be analyzed for context such as words, phrases, contacts, or the like.

At step 440, any addressable names or contacts may be associated with the document currently being analyzed. Names and associated weights may be mapped to a specific document for storing in the context index 455. The weights assigned may denote a frequency of how often each name occurred. A composite weight may be included for each name for all related documents scanned. This may include mining contact names from the "from:" field, "to:" field, "Cc:" field and "Bcc:" field. At step 445, any results from the analysis of the next document are indexed and the results may be added (or updated) to a context index 455 for defining all currently known candidates in the current context(s) and for use in prioritizing matches (e.g., step 460) for type-ahead candidates for any user input. Processing continues at step 450 which checks for any remaining documents. If any additional documents, the processing continues at step 430, otherwise the parallel flow ends at step 475. At a predetermined interval, step 428 may again be entered.

At step 460, matches from the current document and/or from the context index may be prioritized. In embodiments, the matches may also receive weighting as determined by the user's preferences, time-association (e.g., more recent documents provide a higher weight), or the like to facilitate the prioritization. At step 465, the higher prioritized candidates (or, alternatively, the highest prioritized candidate) may be displayed in results field for type-ahead selection by the user.

In embodiments, a client or server process may examine every new message (e.g., email message) and collect the unique addresses from the address fields (e.g., "from:", "to:", "Cc:", "Bcc:") and store them in a memory or database. The process may then compare these addresses to see if they are already stored in the user's address book. If the addresses are not already stored in the address book, then the process may compare these addresses to see if they are stored in a "virtual address book" maintained by the system. The virtual address book automatically maintains addresses so that the user does not have to specifically add addresses to the virtual address book. If any of the newly found addresses are not in this virtual address book, then the system adds any new addresses to the virtual address book. This may include creating a new record and populating the record with a "user name" parsed from SMTP Originator field, "From:" field, "Reply to" field, and the "address" may be populated from the email portion of the SMTP "Originator field," "From field," in "reply to" fields. The current date/time may be used to populate the "recently received" field with an initial value of "1" inserted into the "frequency received" field and if the message is part of a conversation thread, a thread id is used to populate the "shared thread with" field with a value of 1 [O=false, 1=true], for example.

For any existing addresses that match the newly found addresses, their virtual address book records may be updated by posting the current date/time in a "recently received" field of the virtual address book entry, and by incrementing the value in the "frequency, received" field by 1.

The system may also perform a similar process on new outgoing messages. For example, looking for any addresses, creating new records with user name, email address, recently sent (i.e., time/date) and frequency sent (e.g., initial value 1). Also, updating any existing records fields for recently sent to (time/date) and frequency sent (increment existing value by 1), and then if the message is part of a conversation thread the system may populate the "shared thread with" field with a value of 1 [O=false, 1=true], as well as the "participated in a thread with" field with a value of 1 [O=false, 1=true]. The page contains user interface that permits the user to edit the list—manually adding, removing or modifying any of the fields in the address record, as well as to select any number of addresses (e.g., using conventional gestures for accumulating selections in a list) that are subsequently used in the addressing of new or existing outgoing messages. The system may also provide a user interface comprising a page for displaying the list of addresses or names from the virtual address book.

This list may contain filters that show only name and addresses of those messages that match choices of:

- "recently received" (with number of days that are considered recent, showing only those addresses with date values in the recently received field within the date range from today back the number of days indicated),
- "recently sent to" (with number of days that are considered recent, showing only those addresses with date values in the recently sent to field within the date range from today back the number of days indicated),
- "frequently received from" (with a number representing the cutoff value for frequency, showing only those exceeding that value),
- "frequently sent to" (with number representing the cutoff value for frequency, showing only those addresses exceeding that value),
- "shared thread with" (showing only those addresses with a true value in the shared thread field),
- "participated in thread with" (showing only those addresses with a true value in the participated in thread with thread field).

This page may also provide a second ordered list containing a single item matching each label of the above fields and user interface for reordering this list. The purpose of this list is in determining the "priority" when the addressing auto-completion process matches to more than one address in the virtual address book. The user may order the fields so that certain fields are considered more important in matching during auto-completion.

In embodiments, this may also allow the addressing of messages through auto-completion of names based on the records and their values from the virtual address book. The process may auto-complete to the name that matches the characters the user has typed, and in the event there are more than one address that matches the characters typed, the auto-complete system uses the ordered list of virtual address book fields (described above) to determine which of the multiplicity of addresses to show the user first. The auto-complete system may also provide a user interface (e.g., a graphical user interface) that permits the user to cycle through the addresses (e.g., using arrow keys).

Also, the entire virtual address book may be kept and maintained on the client machine. This provides for the above functionality when the client is not able to communicate with a server that traditionally maintains address books and auto-complete functionality.

While the invention has been described in terms of embodiments, those skilled in the art will recognize that the invention can be practiced with modifications and in the spirit and scope of the appended claims.

What is claimed is:

1. A system, comprising at least one component, the component comprising a processor to determine a context of a plurality of past non-threaded emails or documents of a user by analyzing the plurality of past non-threaded emails or documents for words or phrases, wherein the plurality of past non-threaded emails or documents are associated with a software application;

generate a context index associating the plurality of the past non-threaded emails or documents of the determined context with corresponding repeatable values within the plurality of past non-threaded emails or documents;

receive one or more characters in a current email or document of the software application;

determine a context of the current email or document by analyzing the current email or document for current words or phrases in the current email or document, wherein the context of the current email or document corresponds to the context of past non-threaded emails or documents;

determine matches between the current words or phrases and words or phrases of the plurality of past non-threaded emails or documents of the context index;

identify, based on the determined matches, one or more of the corresponding repeatable values;

match the identified corresponding repeatable values with the one or more received characters to identify one or more candidate words; and present the one or more candidate words to a user on a computer as type-ahead choices for inclusion in the current email or document.

2. The system of claim 1, wherein:

the repeatable values are addressable names or contacts; and the context index associates the addressable names or contacts with weights based on their frequency of occurrence within the plurality of past non-threaded emails or documents.

3. The system of claim 1, further comprising the at least one component to:

create a preferences profile that defines preferred words or phrases for use in prioritizing the one or more candidate words; and prioritize the one or more candidate words based on the preferences profile.

4. The system of claim 1, wherein analyzing the current email or document comprises:

analyzing the past non-threaded emails or documents for their context by identifying matching keywords or phrases between the past non-threaded emails or documents and the current email or document;

associating the corresponding repeatable values for the matched past non-threaded emails or documents with the identified matching keywords or phrases; and creating the context index of the corresponding repeatable values for use by the determining matches step.

5. The system of claim 1, further comprising the at least one component to prioritize the one or more candidate words based on the context index.

6. The system of claim 1, further comprising the at least one component to receive at least one additional character when more than one match occurs and repeating the matching step.

7. The system of claim 1, further comprising the at least one component to make one of the one or more candidate words a permanent word in the current email or document.

8. The system of claim 1, wherein the current email or document is in response to or related to one or more previous communications, and further comprising the at least one component to:

create a list of contacts from the one or more previous communications;

create a list of any contacts in a body of the one or more previous communications; and create a list of contacts included in any past non-threaded emails or documents involving any contacts associated in any address field in any of the one or more previous communications.

9. The system of claim 8, wherein to present the one or more candidate words to the user is based on any of the lists.

10. The system of claim 1, wherein the analyzing the past non-threaded emails or documents comprises:

creating a database, which is a running log of messages sent, a record of to whom the messages were sent, messages received, and a record of from whom the messages were received, the database comprising a correlation table comprising:

corresponding values for the messages sent and the messages received that are considered similar in subject matter; and one or more uncommon words that appear within the messages sent and the messages received;

wherein the corresponding repeatable values for the messages sent and the messages received are the corresponding values in the context index.

11. The system of claim 10, wherein the database is derived by a combination of (i) pre-set list of the one or more uncommon words that are known and (ii) a real-time analysis of the messages and a related frequency of words in the messages in which a threshold percentage of usage defines targets for comparison.

12. The system of claim 11, further comprising the at least one component to display a list of addresses and names from a virtual address book, the list including one or more filters that show only the addresses and the names that are received, sent to, received from, shared thread with, or participated in thread with.

13. The system of claim 1, wherein the words or phrases in the current email or document are current words or phrases.

14. The system of claim 13, wherein to determine matches between the current words or phrases and words or phrases of the plurality of documents of the context index further includes matches between the current words or phrases and words or phrases of the plurality of past non-threaded emails.

15. The system of claim 1, further comprising the at least one component to assign a weight to the one or more candidate words based on the match with the corresponding repeatable values, a frequency match, a time based proximity, an inclusive reference, and an associative match.

16. The system of claim 15, wherein the at least one component selects the one or more candidate words based at least in part on the assigned weight.

17. The system of claim 1, further comprising the at least one component to:

receive at least one additional character when more than one match occurs and repeating the matching step; and make one of the one or more candidate words a permanent word in the current email or document.

* * * * *